United States Patent
Takayama

(10) Patent No.: US 9,454,802 B2
(45) Date of Patent: Sep. 27, 2016

(54) ELECTRONIC APPARATUS, METHOD AND STORAGE MEDIUM

(71) Applicant: Kabushiki Kaisha Toshiba, Minato-ku, Tokyo (JP)

(72) Inventor: Shunsuke Takayama, Tachikawa Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 5 days.

(21) Appl. No.: 14/676,617

(22) Filed: Apr. 1, 2015

(65) Prior Publication Data

US 2016/0125573 A1 May 5, 2016

(30) Foreign Application Priority Data

Oct. 29, 2014 (JP) .................................. 2014-220345

(51) Int. Cl.
 *G06K 9/32* (2006.01)
 *G06T 3/40* (2006.01)
 *G06T 1/00* (2006.01)
 *G06T 5/00* (2006.01)
 *G06T 5/50* (2006.01)

(52) U.S. Cl.
 CPC ............... *G06T 3/4076* (2013.01); *G06K 9/32* (2013.01); *G06T 1/0007* (2013.01); *G06T 5/005* (2013.01); *G06T 5/50* (2013.01); *G06K 2209/21* (2013.01); *G06T 2207/10004* (2013.01); *G06T 2207/10016* (2013.01); *G06T 2207/20224* (2013.01)

(58) Field of Classification Search
None
See application file for complete search history.

(56) References Cited

U.S. PATENT DOCUMENTS

| 7,117,256 | B1* | 10/2006 | Blinn ................. | H04N 21/4122 375/E7.011 |
| 7,788,596 | B2* | 8/2010 | Iwabuchi ............ | G06F 17/3028 345/428 |
| 7,916,165 | B2* | 3/2011 | Ferren ..................... | H04N 7/15 348/14.08 |
| 7,979,340 | B2* | 7/2011 | MacDonald Korth | G06Q 10/06 705/26.5 |
| 8,218,940 | B2* | 7/2012 | Sultenfuss ............... | H04N 5/46 386/232 |
| 8,934,755 | B2* | 1/2015 | Sultenfuss ............... | H04N 5/46 386/230 |
| 2007/0242129 | A1* | 10/2007 | Ferren .................... | H04N 7/142 348/14.01 |
| 2011/0102670 | A1 | 5/2011 | Tanji et al. | |
| 2016/0092446 | A1* | 3/2016 | Nye .................... | G06F 17/3028 705/3 |

FOREIGN PATENT DOCUMENTS

| JP | 11-249835 A | 9/1999 |
| JP | 2010-021774 A | 1/2010 |
| JP | 2010-114534 A | 5/2010 |

* cited by examiner

*Primary Examiner* — Feng Niu
(74) *Attorney, Agent, or Firm* — Knobbe, Martens, Olson & Bear LLP

(57) ABSTRACT

In one embodiment, an electronic apparatus includes a processor configured to select a first image, resize the selected first image to a first resized image, enhance the quality of the first resized image to generate a second image, display the second image, resize, when the displayed second image is designated as an object to be shared, the selected first image to a second resized image, and enhance the quality of the second resized image to generate a third image, the third image sent to the second application program and/or the external device.

5 Claims, 9 Drawing Sheets

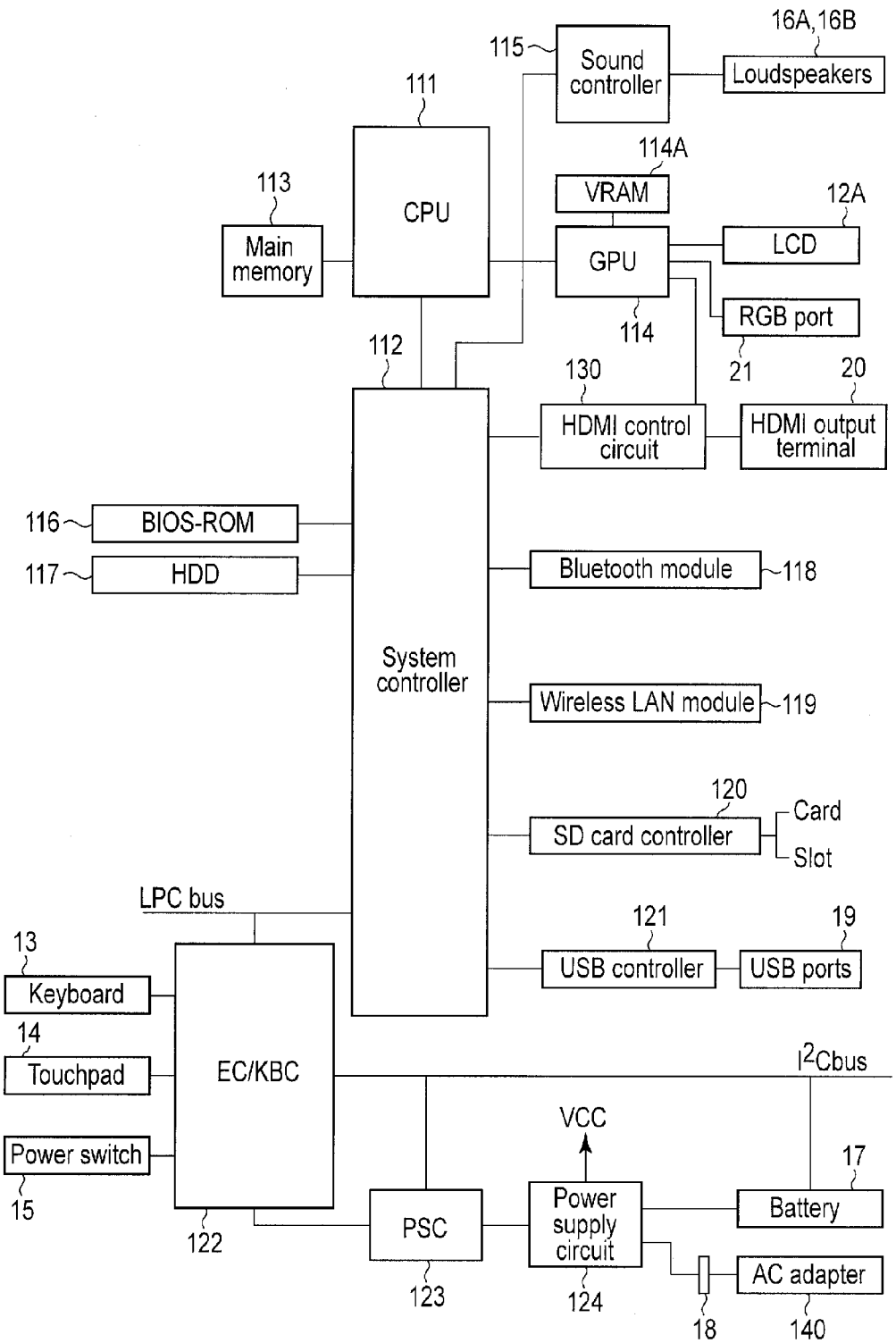
F I G. 2

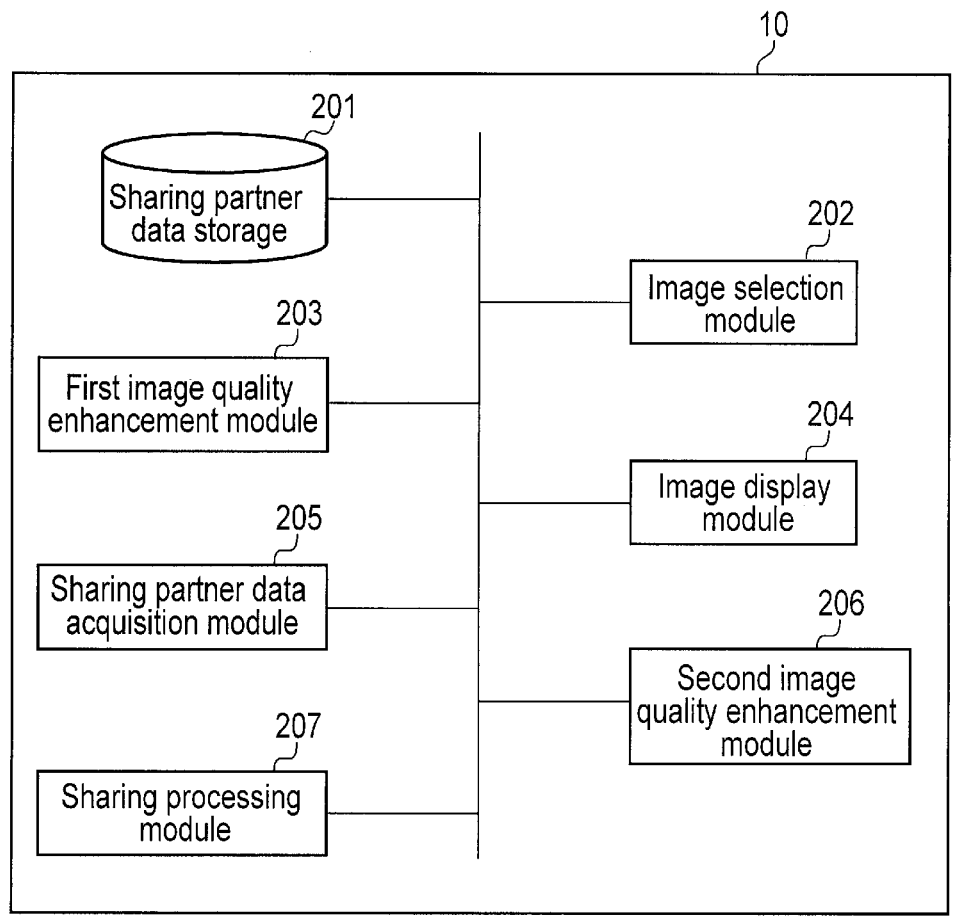
F I G. 3

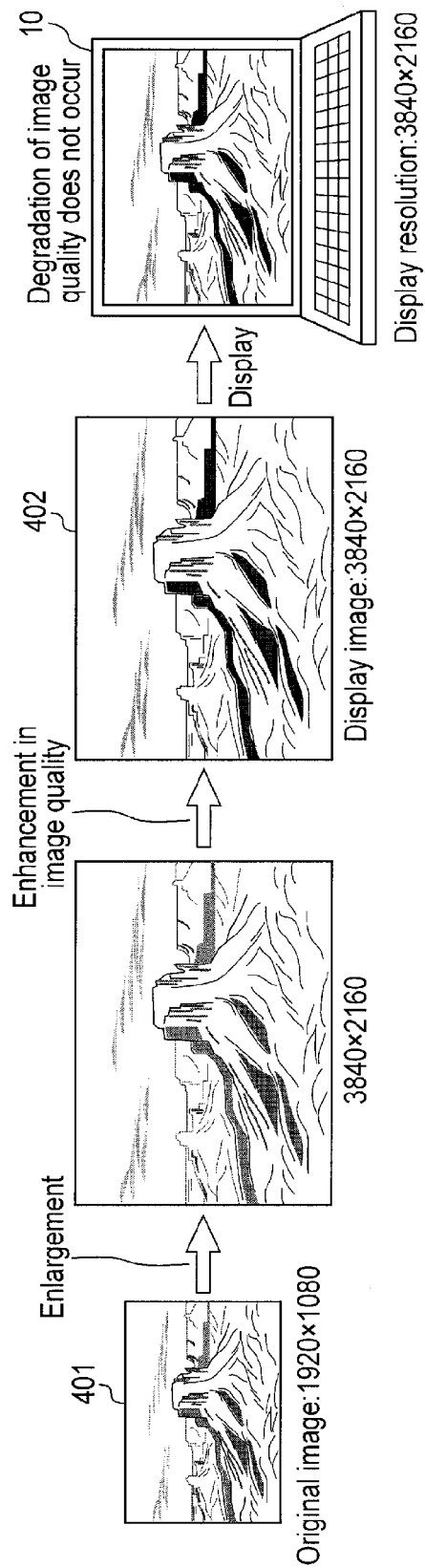
F I G. 6

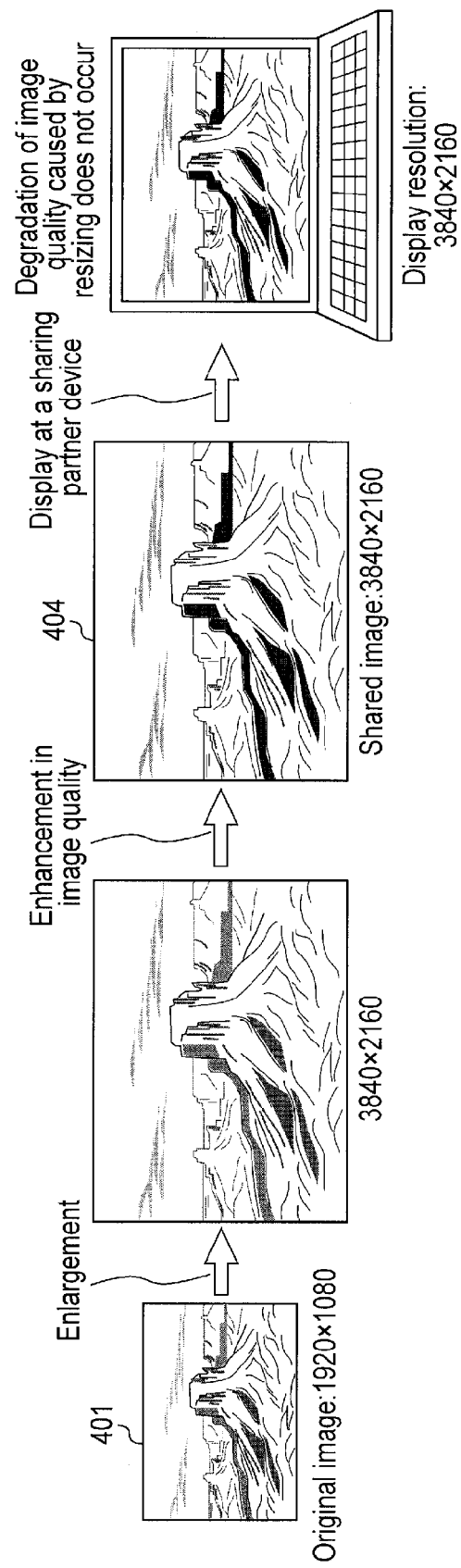
F I G. 8

ELECTRONIC APPARATUS, METHOD AND STORAGE MEDIUM

CROSS-REFERENCE TO RELATED APPLICATIONS

This application is based upon and claims the benefit of priority from Japanese Patent Application No. 2014-220345, filed Oct. 29, 2014, the entire contents of which are incorporated herein by reference.

FIELD

Embodiments described herein relate generally to an electronic apparatus, a method and a storage medium.

BACKGROUND

Generally, various electronic apparatuses are known, including notebook, desktop and tablet computers. These electronic apparatuses execute predetermined application programs (hereinafter referred to as viewer applications) when they display (moving or still) images.

Some viewer applications subject respective images to respective image quality enhancement processes when they display the images. The image quality enhancement processes enable the viewer applications to display high-definition images.

On the other hand, some of the electronic apparatuses are known to have functions of sharing images (hereinafter referred to as sharing functions), which their viewer applications are presently displaying, with another application or another device (hereinafter referred to as a sharing partner). Each of the sharing functions may cooperate with another application to allow an image to be posted to a Web social networking site, or to be attached to an e-mail. The sharing function allows the sharing partner to use the presently displayed image.

However, when an image is shared with the sharing partner, the sharing partner may often adjust resolution of the image (namely, may often subject the image to a resizing process) as needed.

When an image is shared with a sharing partner as described above, it is desirable that the sharing partner should handle a high-definition image. Therefore, it may be conceived that an image which the viewer application has subjected to the image quality enhancement process is shared with the sharing partner.

However, the image quality enhancement process which the viewer application executes is based on the display resolution of the electronic apparatus on which the viewer application runs (namely, the electronic apparatus which displays the image). Therefore, there is a possibility that the sharing partner cannot use the high-definition image (namely, degradation of the image occurs) if the image having been subjected to the image quality enhancement process is adjusted in resolution to the sharing partner.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 2 is a view illustrating an example of a system configuration of the electronic apparatus illustrated in FIG. 1;

FIG. 3 is a block diagram illustrating an example of a main functional configuration of the electronic apparatus of the embodiment;

FIG. 6 is a view for explaining an example of a display image which the electronic apparatus displays;

FIG. 8 is a view for explaining an example of a shared image to be sent to a sharing partner device;

DETAILED DESCRIPTION

Various embodiments will be described hereinafter with reference to the accompanying drawings.

In general, according to one embodiment, an electronic apparatus includes a storage and a processor. The storage is configured to store sharing partner data indicative of an external device and/or a second application program, the second application program comprising a function of sharing images with the first application program. The processor is configured to select a first image to be displayed by the first application program; resize the selected first image to a first resized image, the first resized image configured for display on the electronic apparatus; enhance the quality of the first resized image to generate a second image; display the second image; resize, when the displayed second image is designated as an object to be shared, the selected first image to a second resized image, the second resized image configured for the second application program and/or the display of the external device based on the sharing partner data stored in the storage; and enhance the quality of the second resized image to generate a third image, the third image sent to the second application program and/or the external device.

Figure 1:
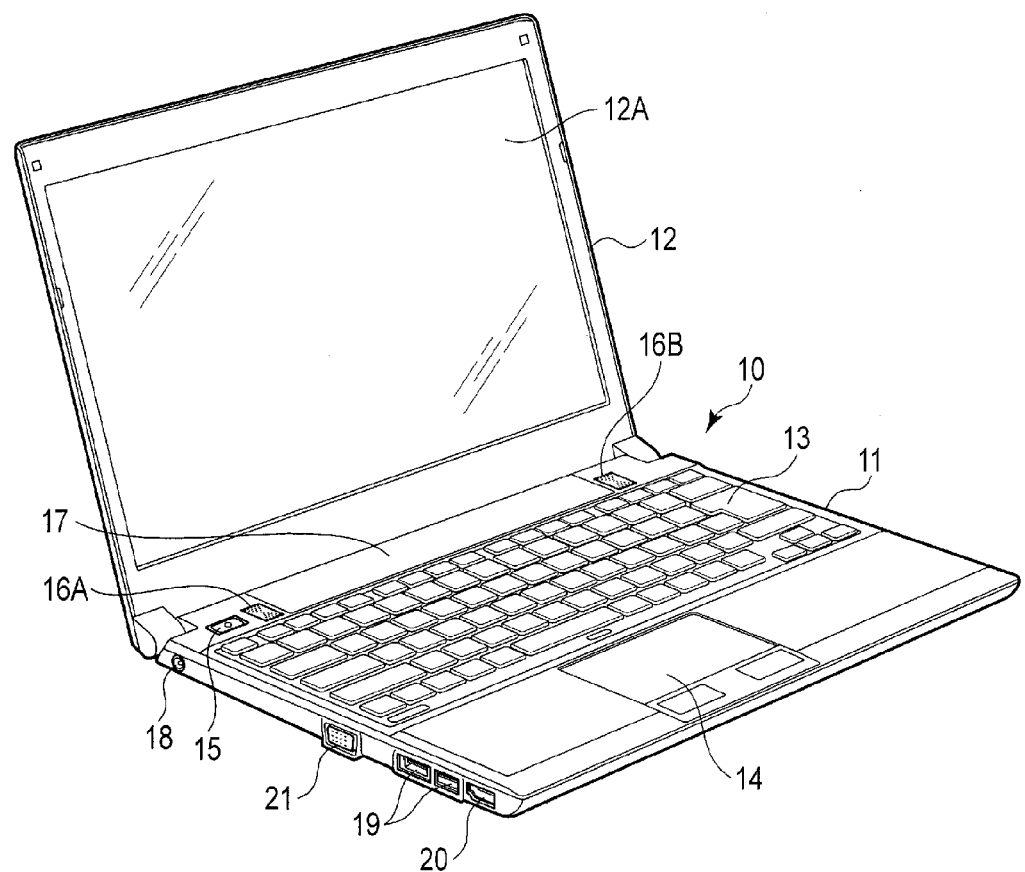
FIG. 1 is a perspective view illustrating an example of an external appearance of the electronic apparatus of the embodiment.

FIG. 1 is a perspective view illustrating the external appearance of an electronic apparatus of the present embodiment. It should be noted that the present embodiment may be realized in a variety of electronic apparatuses, including notebook, desktop or tablet computers, for instance. In FIG. 1, it is assumed that the electronic apparatus realizing the embodiment is a notebook computer.

As illustrated in FIG. 1, the electronic apparatus 10 includes an electronic apparatus body (computer body) 11 and a display unit 12. A display device such as a liquid-crystal display (LCD) 12A is installed in the display unit 12.

The display unit 12 is attached to the electronic apparatus body 11 in such a manner that it can freely hinge between an open position, in which the upper surface of the electronic apparatus body 11 exposes, and a closed position, in which the upper surface of the electronic apparatus body 11 is covered with the display unit 12. The electronic apparatus body 11 has a thin box-shaped case, on whose top surface there are arranged a keyboard 13, a touchpad 14, a power switch 15 for rendering the electronic apparatus 10 active or inactive, and loudspeakers 16A, 16B.

The electronic apparatus 10 is so constructed as to receive electricity from a battery 17. In the present embodiment, the battery 17 is embedded in the electronic apparatus 10, for instance.

Furthermore, there is provided a power connector (a DC power supply input connector) 18 at the electronic apparatus body 11. The power connector 18 is provided on a side of the electronic apparatus body 11. For instance, it is provided on the left side of the electronic apparatus body 11. An external power supply is removably connected to the power connector 18. The external power supply includes an AC adapter. The AC adapter is a power supply that converts commercially available power (AC power) to DC power.

The electronic apparatus 10 is driven by the power from the battery 17 or the power from the external power supply. While the external power supply is not connected to the power connector 18 of the electronic apparatus 10, the electronic apparatus 10 is driven by the power from the battery 17. While the external power supply is connected to the power connector 18 of the electronic apparatus 10, the electronic apparatus 10 is driven by the power from the external power supply. The power from the external power supply is also used to charge the battery 17.

Furthermore, there are provided at the electronic apparatus body 11 some USB ports 19, a High-Definition Multimedia Interface (HDMI [registered trademark]) output connector 20, and an RGB port 21.

FIG. 2 is a view illustrating a system configuration of the electronic apparatus 10 illustrated in FIG. 1. The electronic apparatus 10 includes a CPU 111, a system controller 112, a main memory 113, a graphics processing unit (GPU) 114, a sound controller 115, a BIOS-ROM 116, a hard disk drive (HDD) 117, a Bluetooth (registered trademark) module 118, a wireless LAN module 119, an SD card controller 120, a USB controller 121, an embedded controller/keyboard controller IC (EC/KBC) 122, a power supply controller (PSC) 123, a power supply circuit 124, and so forth.

The CPU 111 is a processer for controlling the operation of every component of the electronic apparatus 10. The processor includes at least one circuitry. The CPU 111 executes software, such as an operating system (OS) and various application programs, loaded from the HDD 117 to the main memory 113.

It should be noted that an application program for displaying an image (hereinafter referred to as a viewer application) is included in the various application programs which the CPU 111 executes in the present embodiment. The viewer application has a function of suitably executing a resizing process and an image quality enhancement process upon displaying an image on the screen (display unit 12) of the electronic apparatus 10. The image in the present embodiment includes a static image (a photograph, for instance) and a moving image.

The CPU 111 also runs a Basic Input/Output System (BIOS) stored in the BIOS-ROM 116, which is a nonvolatile memory. The BIOS is a system program for executing hardware control.

The system controller 112 is a bridge device configured to connect the CPU 111 to each of the components. The system controller 112 internally has a serial ATA controller for controlling the HDD 117. The system controller 112 communicates with each device on a Low PIN Count (LPC) bus.

The GPU 114 is a display controller configured to control the LCD 12A used as a display monitor of the electronic apparatus 10. The GPU 114 generates a display signal (an LVDS signal), which should be supplied to the LCD 12A, from the display data stored in a video memory (VRAM) 114A.

Furthermore, the GPU 114 can generate from the display data analog RGB signals and an HDMI video signal: An HDMI output connector 20 can send out the HDMI video signal (an uncompressed digital video signal) and the digital audio signal to an external display with the help of a single cable. The analog RGB signals are supplied through the RGB ports 21 to the external display.

An HDMI control circuit 130 is an interface configured to send out the HDMI video signal and the digital audio signal to the external display with the help of the HDMI output connector 20.

The sound controller 115 is a sound source device, and outputs audio data, which is an object to be reproduced, to loudspeakers 16A, 16B, for instance.

The Bluetooth module 118 is a module configured to execute radio communication with a Bluetooth-capable device using Bluetooth.

The wireless LAN module 119 is a module configured to execute radio communication conforming to one of the IEEE 802.11 family of standards, for instance.

The SD card controller 120 writes/reads data into/from a memory card inserted into a card slot at the electronic apparatus body 11.

The USB controller 121 communicates with external devices which are connected through the USB ports 19.

The EC/KBC 122 is connected to the LPC bus. The EC/KBC 122 is interconnected with the PSC 123 and the battery 17 through a serial bus such as an I$^2$C bus.

The EC/KBC 122 is a power management controller configured to execute power management of the electronic apparatus 10, and is realized as a single-chip microcomputer internally having a keyboard controller for controlling the keyboard (KB) 13 and the touchpad 14, for instance. The EC/KBC 122 has a function of rendering the electronic apparatus 10 active or inactive according to the user's operation of the power switch 15. The control for rendering the electronic apparatus 10 active or inactive will be achieved by the cooperation between the EC/KBC 122 and the PSC 123. Specifically, the EC/KBC 122 supplies an activation signal to the PSC 123. Upon reception of the activation signal, the PSC 123 causes the power supply circuit 124 to power up the electronic apparatus 10. Similarly, the EC/KBC 122 supplies a deactivation signal to the PSC 123. Upon reception of the deactivation signal, the PSC 123 causes the power supply circuit 124 to power off the electronic apparatus 10.

The power supply circuit 124 receives electric power from the battery 17 or, alternatively, from the AC adapter 140 when the AC adapter 140 is connected to the electronic apparatus body 11 as an external power source. The power supply circuit 124 uses the received electric power to generate operating power Vcc and supplies the generated operating power Vcc to each component.

FIG. 3 is a block diagram illustrating a main functional configuration of the electronic apparatus 10 of the present embodiment. As illustrated in FIG. 3, the electronic apparatus 10 includes a sharing partner data storage 201, an image selection module 202, a first image quality enhancement module 203, an image display module 204, a sharing partner data acquisition module 205, a second image quality enhancement module 206, and a sharing processing module 207.

In the present embodiment, the HDD 117 illustrated in FIG. 2, for instance, includes the sharing partner data storage 201. Furthermore, each of the modules 202-207 will be implemented when the CPU 111 (or the computer of the electronic apparatus 10) executes the above-mentioned viewer application (program).

Let us assume here that the electronic apparatus 10 of the present embodiment has a function (hereinafter referred to as a sharing function) of sharing an image (a file) which the viewer application is presently displaying with another application program (hereinafter referred to as a sharing partner application) which the electronic apparatus 10 can execute. The sharing function makes it possible to transfer an image, which the viewer application is displaying at present, to the sharing partner application, allowing the sharing partner application to use the image. The sharing partner application may include an application program for using a social networking service and an application program for sending/receiving e-mails. Furthermore, it does not matter if the sharing partner application may be, for instance, an application program for editing images or for utilizing a moving image sharing service for posting a moving image.

The sharing partner data storage 201 keeps data about sharing partner application (hereinafter referred to as sharing partner data). The sharing partner data may include, for instance, a resolution of an image which the sharing partner application can handle. Let us suppose that the sharing partner data (resolution) is associated with the name of the sharing partner application and is previously registered in the sharing partner data storage 201.

The image selection module 202 selects an image as a display image displayed by the viewer application from the images stored in the HDD 117 of the electronic apparatus 10, for instance. The image selection module 202 selects an image in response to the user operation executed at the electronic apparatus 10. The image selected by the image selection module 202 will be hereinafter referred to as an original image.

The first image quality enhancement module 203 subjects the original image to a resizing process and an image quality enhancement process, both the processes being suitable for the electronic apparatus 10. The first image quality enhancement module 203 generates a high-definition image (hereinafter referred to as a display image) to be displayed on the screen of the electronic apparatus 10.

The image display module 204 displays on the screen of the electronic apparatus 10 the display image having been generated by the first image quality enhancement module 203. This allows the user of the electronic apparatus 10 to view the high-definition image (display image).

Since the electronic apparatus 10 of the present embodiment has a sharing function as explained above, the user of the electronic apparatus 10 can specify (designate) the display image presently displayed on the screen of the electronic apparatus 10 as a sharing object.

The sharing partner data acquisition module 205 acquires sharing partner data about sharing partner application from the sharing partner data storage 201 when the user specifies the display image as a sharing object.

The second image quality enhancement module 206 subjects the original image to a resizing process and an image quality enhancement process, both the processes being suitable for the sharing partner application, based on the sharing partner data which the sharing partner data acquisition module 205 has acquired. The second image quality enhancement module 206 generates an image which will be transferred to the sharing partner application due to the sharing function (hereinafter referred to as a shared image).

The sharing processing module 207 transfers (sends) to the sharing partner application the shared image having been generated by the second image quality enhancement module 206. The transferred shared image is thus ready for the sharing partner application.

Figure 4:
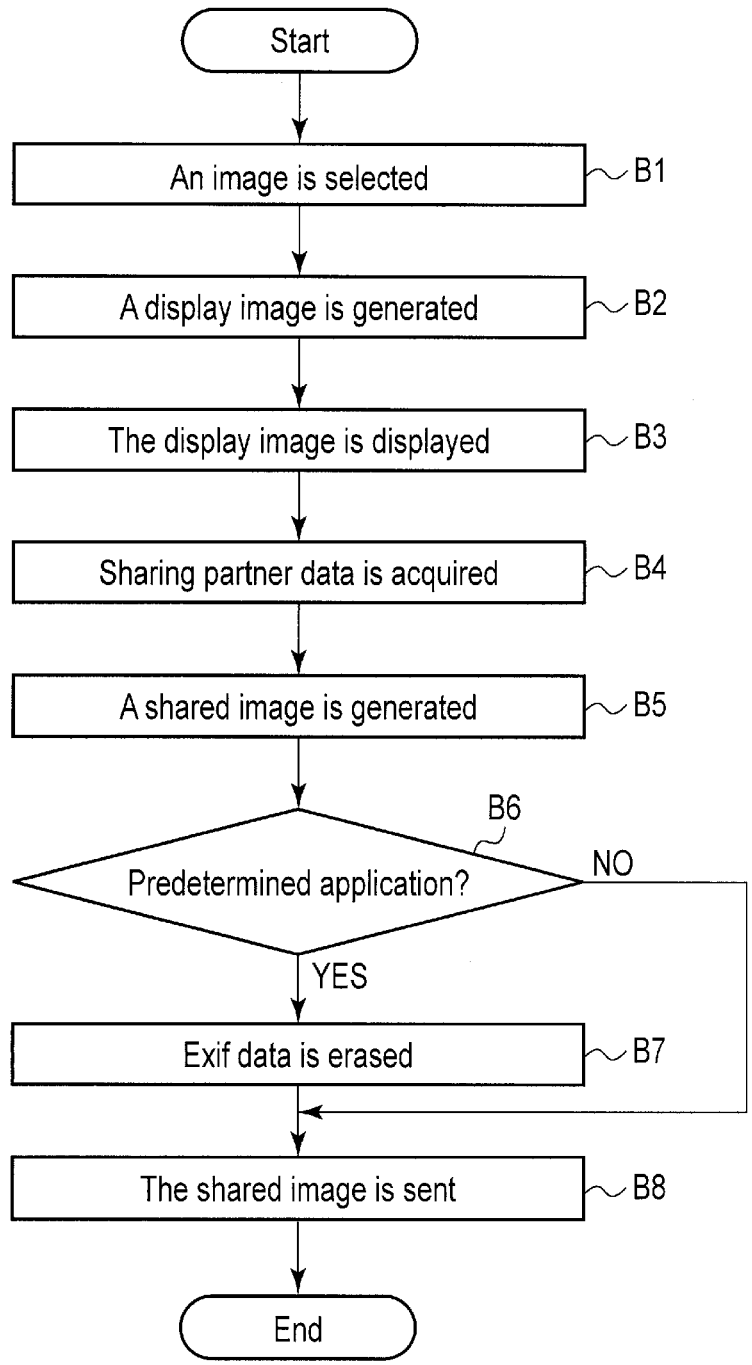
FIG. 4 is a flowchart illustrating an example of the procedure which the electronic apparatus of the embodiment follows.

Now, the procedure which the electronic apparatus 10 of the present embodiment follows will be explained below with reference to the flowchart illustrated in FIG. 4. What will be described here is a process for allowing an image to be shared between the viewer application (the first application program) and a sharing partner application program (the second application program), which the electronic apparatus 10 executes.

Let us suppose that the electronic apparatus 10 executes the viewer application in response to the user's operation, for instance. When the viewer application is executed, the electronic apparatus 10 displays on its screen a list of images stored in the HDD 117, for instance. The user operates the electronic apparatus 10 to specify a desired image from the list of the images displayed on the electronic apparatus 10.

The image selection module 202 selects an image (an original image) according to instructions given by the user from the list of the images displayed on the screen of the electronic apparatus 10 (Block B1).

The original image having been selected by the image selection module 202 is then subjected to a resizing process (a first resizing process), which is executed by the first image quality enhancement module 203. The original image having been subjected to the resizing process is subsequently subjected to an image quality enhancement process, which is also executed by the first image quality enhancement module 203. The first image quality enhancement module 203 thus generates a display image (a second image) (Block B2).

The resizing process includes a process of making an image bigger or smaller. The image quality enhancement process includes a process of emphasizing edges of an image to sharpen the image (hereinafter referred to as a sharpening process), a process of emphasizing the contrast of the image (hereinafter referred to as a contrast enhancement process), a process of correcting the color tone of the image (hereinafter referred to as a color correction process), a process of reducing (removing) the noise included in the image (hereinafter referred to as a noise removal process), and so forth.

Namely, in the process of Block B2, the original image is subjected to the resizing process to suit the resolution of the original image to the resolution (display resolution) of the electronic apparatus 10, thereby obtaining an enlarged or reduced original image, and then the resultant image is further subjected to the sharpening process, the contrast enhancement process, the color correction process, the noise removal process, etc., and a display image (an image which is improved in image quality and is suitable in resolution for the electronic apparatus 10) will be obtained.

The display image having been generated by the first image quality enhancement module 203 is displayed on the screen of the electronic apparatus 10 by the image display module 204 (Block B3).

As having been explained above, when the user operates the electronic apparatus 10 while the display image is being displayed on the screen of the electronic apparatus 10, then the display image will be specified as a sharing object. At this moment, a sharing partner application may be also specified by the user for sharing the image.

The sharing partner data acquisition module 205 acquires from the sharing partner data storage 201 sharing partner data about sharing partner application which the user has just specified (Block B4). The sharing partner data acquired here may include a resolution of an image which the sharing partner application specified by the user can handle (or use).

The second image quality enhancement module 206 subjects the original image selected by the image selection module 202 to a resizing process (a second resizing process) suitable for the sharing partner application specified by the user. The second image quality enhancement module 206 subsequently subjects the original image just having been subjected to the resizing process to an image quality enhancement process. The second image quality enhancement module 206 thus generates a shared image (a third image) (Block B5). The process of Block B5 will be executed based on the sharing partner data acquired by the sharing partner data acquisition module 205.

Specifically, in the process of Block B5, the original image is subjected to the resizing process to suit the resolution of the original image to the resolution which the sharing partner application can handle (namely, the resolution indicated by the sharing partner data having been acquired by the sharing partner data acquisition module 205), thereby obtaining an enlarged or reduced original image, and then the resultant image is further subjected to the sharpening process, the contrast enhancement process, the color correction process, the noise removal process, etc., and a shared image (an image which is improved in image quality and is suitable in resolution for the sharing partner application) will be obtained.

It should be noted here that an image (file) sometimes has additional data called, for instance, Exif data. The Exif data sometimes has not only the setting data of the camera and the date and time when the image having the Exif data was captured, but also GPS data indicative of the location where the image was captured. If the name of the user is registered with the camera, then the Exif data may have the name of the user. The Exif data added to an image therefore may include private data. If such an image is shared with an application program for using the aforementioned social networking site (hereinafter referred to as a social networking application) and is posted to the social networking site, a security problem may arise.

In the present embodiment, the Exif data added to a shared image (additional data) will be eliminated according to the kind of a sharing partner application specified by the user.

Specifically, the sharing processing module 207 determines whether or not the sharing partner application specified by the user is such an application (hereinafter referred to as a predetermined application) that may cause a security problem in the same way as the social networking application does if an image having Exif data is shared between the electronic apparatus 10 and the sharing partner application (Block B6). It should be noted that the predetermined application is supposed to be specified in advance for the electronic apparatus 10, for instance.

When it is determined that the sharing partner application specified by the user is the predetermined application (YES in Block B6), the sharing processing module 207 erases the Exif data added to the shared image having been generated by the second image quality enhancement module 206 (Block B7).

After the process of Block B7 has finished, the sharing processing module 207 transfers the shared image, from which the Exif data has been erased, to the sharing partner application specified by the user (Block B8). The transferred shared image thus will be safe to be used by the sharing partner application.

Whereas, when it is determined that the sharing partner application specified by the user is not the predetermined application (NO in Block B6), the process of Block B7 is not executed and the Exif data added to the shared image will not be erased. Therefore, the shared image transferred to the sharing partner application specified by the user has the Exif data.

Now, the sharing function, the display image, and the shared image, all having been described above, will be more specifically explained below. First of all, one example of how to operate the electronic apparatus 10 for making use of the aforementioned sharing function will be explained with reference to FIG. 5. An exemplified display screen of the electronic apparatus 10 for executing the sharing function is illustrated in FIG. 8. It should be noted that the display screen is supposed to be used when the operating system of the electronic apparatus 10 is Windows (registered trademark) 8.1. However, an Android (registered trademark) operating system or any other operating system may be used as an operating system of the electronic apparatus 10.

Figure 5:
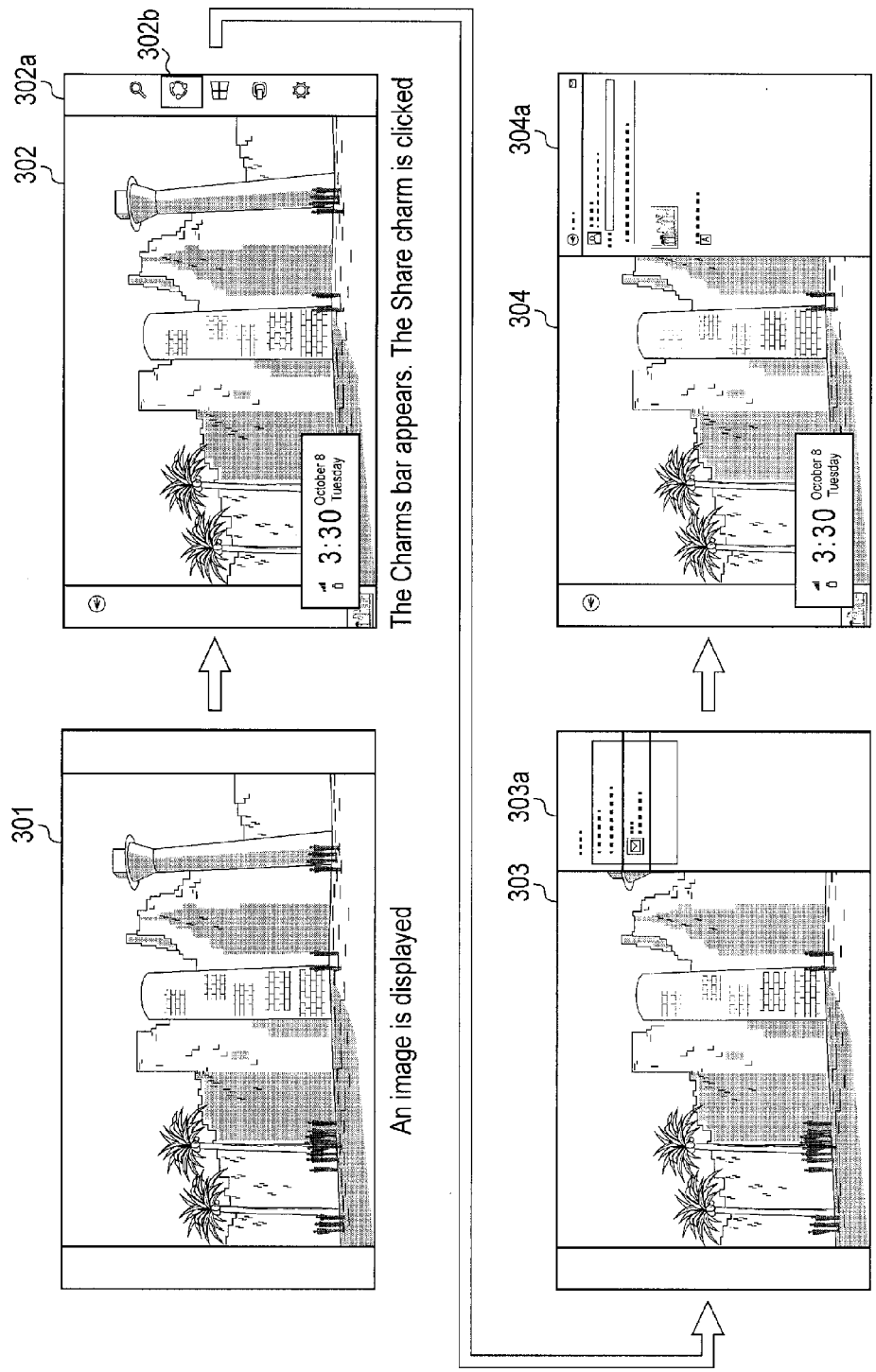
FIG. 5 is a view for explaining one exemplary operation of the electronic apparatus 10 to make use of the sharing function.

The display screen 301 illustrated in FIG. 5 is an example of a screen on which an image is displayed due to the execution of the above-mentioned viewer application. When the user performs a predetermined operation on the display screen 301, the display screen 301 will change to the display screen 302. In the display screen 302, a toolbar (Charms bar) 302a appears. Various icons for executing the various functions, in which a Share icon 302b for executing the sharing function is included, are displayed on the toolbar 302a. When using the sharing function, the user selects the Share icon 302b displayed on the toolbar 302a (namely, the user specifies as a sharing object the image presently displayed on the display screen).

When the Share icon 302b displayed on the toolbar 302a is selected by the user, the display screen 302 changes to the display screen 303. There will be displayed in the display screen 303 a sharing partner selection region 303a. A list of sharing partner applications is displayed in the sharing partner selection region 303a. The user specifies a desired sharing partner application from the list of sharing partner applications. Let us suppose here that an application program for sending/receiving e-mails (hereinafter referred to as a mailing application) is selected, for instance.

When the mailing application is selected (specified) at the sharing partner selection region 303a, the image which the viewer application is presently displaying will be shared with the mailing application, which allows the mailing application to use the image.

Specifically, the display screen 303 changes to a display screen 304 and a mailing region 304a will be displayed on the display screen 304. The user performs at the mailing region 304a an operation of inputting a title and a body for an e-mail and an operation of sending the e-mail. When sending the e-mail, the user can attach the image which the viewer application is presently displaying.

As having been explained above, the sharing function may be executed when the user performs such an operation that has been explained with reference to FIG. 5 while the viewer application is displaying an image.

It should be noted that the aforementioned explanation has been given on the assumption that the sharing partner application specified by the user would be a mailing application, but it does not matter if the social networking application mentioned above would be specified by the user. When the social networking application is specified by the user, a posting region will be displayed on the display screen 304 instead of the mailing region 304a. The user can post the image, which the viewer application is presently displaying, when the user performs an operation for posting the image at the posting region.

Now, the display image which the electronic apparatus 10 displays and the shared image which is sent to the sharing partner application will be explained below with reference to FIG. 6 and FIG. 7.

Let us suppose here that the original image has a resolution of 1920×1080, whereas that the electronic apparatus 10 has a display resolution of 3840×2160.

In this case, as illustrated in FIG. 6, the original image 401 is subjected to a resizing (enlarging) process suitable for the display resolution of the electronic apparatus 10. The original image 401 having been subjected to the resizing process is furthermore subjected to an image quality enhancement process. Then, a display image 402 having a resolution of 3840×2160 will be obtained. The electronic apparatus 10 displays the display image 402 thus generated. The electronic apparatus 10 allows the user to view a high-definition image on the screen.

When the user executes an operation for specifying an social networking application, for instance, as explained above with reference to FIG. 5 while the electronic apparatus 10 is displaying the display image 402, then the display image 402 may be directly shared between the electronic apparatus 10 and the specified social networking application. This case will be explained below. Let us suppose here that the resolution which the social networking application can handle is 960×540.

In this case, the resolution of the display image 402 and the resolution which the social networking application can handle are different from each other (The former has a resolution of 3840×2160 whereas the latter has a resolution of 960×540). Therefore, if the display image 402 is directly sent to the social networking application, the display image 402 must be subjected to a resizing (reduction) process on the social networking application side. The execution of such a resizing process tends to reduce the image quality. This means that the social networking application cannot use a high-definition image.

Figure 7:
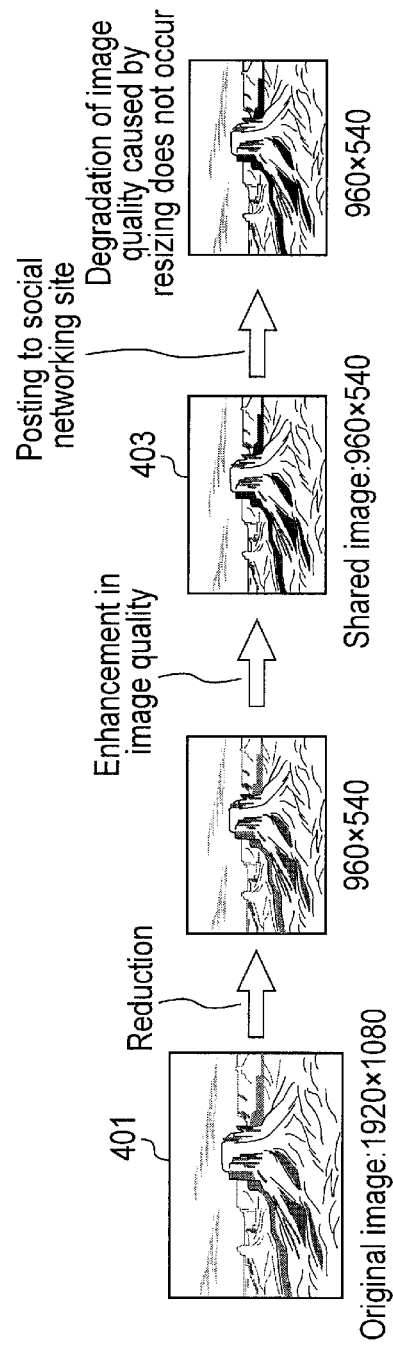
FIG. 7 is a view for explaining an example of a shared image to be sent to a sharing partner application.

Therefore, in the present embodiment, as illustrated in FIG. 7, the viewer application subjects the original image 401 to a resizing (reduction, here) process according to the resolution of the image which the social networking application can handle. The viewer application furthermore subjects to an image quality enhancement process the original image 401 just having been subjected to the resizing process, generating the shared image 403 having a resolution of 960×540. The resolution of the shared image 403 coincides with the resolution of the social networking application (960×540). Therefore, there is no need to subject the shared image 403 sent to the social networking application to the resizing process on the social networking application side. The present embodiment allows the social networking application to use a high-definition image (the shared image 403).

In the present embodiment, an image will be shared with the sharing partner application such as the social networking application. Incidentally, the aforementioned Windows 8.1 supports near-field communication (NFC). NFC makes it possible to send an image to a plurality of devices (namely, an image can be shared with other devices). When NFC is used to share an image with the other devices (hereinafter referred to as sharing partner devices), as illustrated in FIG. 8, the viewer application may subject the original image 401 to the resizing (enlargement here) process suitable for the display resolution (2840×2016) of the sharing partner devices and the image quality enhancement process, thereby generating the shared image 404, which will be sent to the sharing partner devices. This allows each of the sharing partner devices to use (display) a high-definition image. The display resolution of each of the sharing partner devices (included in the sharing partner data) may be stored beforehand in the sharing partner data storage 201.

The display resolution of the sharing partner device illustrated in FIG. 8 (3840×2160) coincides with the display resolution of the electronic apparatus 10 illustrated in FIG. 7. Namely, the display image 402 displayed on the screen of the electronic apparatus 10 and the shared image 404 displayed on the sharing partner device are identical in resolution. Since the display resolution of the sharing partner device (3840×2160) coincides with the display resolution of the electronic apparatus 10, it is possible to send the display image 402 to the sharing partner device as a shared image.

Figure 9:
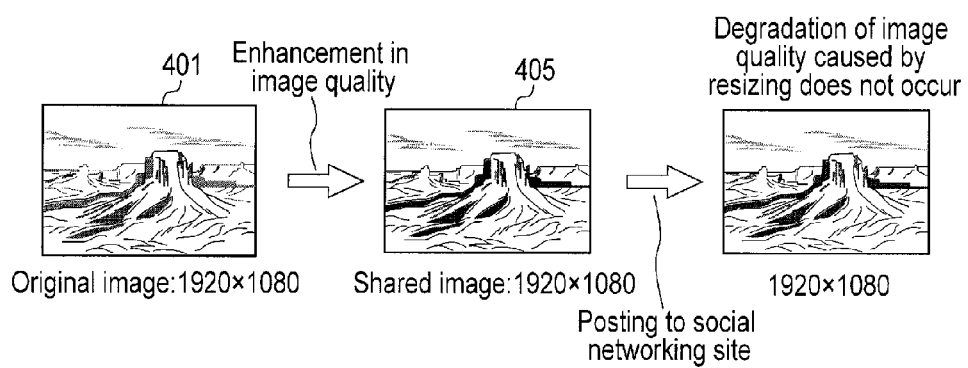
FIG. 9 is a view for explaining an example of a shared image in a case where the resolution of an original image and the resolution which the sharing partner application can handle are in agreement with each other.
Figure 10:
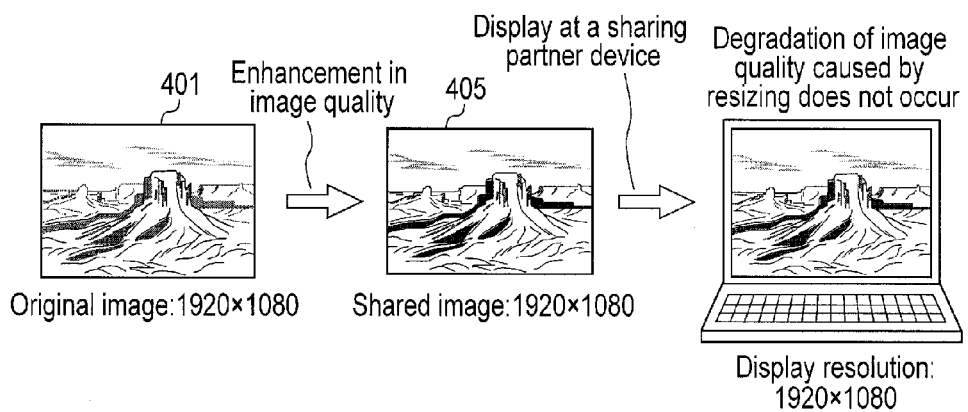
FIG. 10 is a view for explaining a shared image in a case where the resolution of an original image and the display resolution of the sharing partner device are in agreement with each other.

Furthermore, if the resolution of an original image coincides with the resolution which the sharing partner application (social networking application) can handle or the resolution of the display device of the sharing partner device as illustrated in FIG. 9 and FIG. 10, there will be nothing wrong with performing the image quality enhancement process alone to generate the shared image 405.

As described above, an original image (a first image) having been selected as an image which the viewer application (a first application program) should display is subjected to a resizing process (a first resizing process) suitable for the electronic apparatus 10, and the original image having been subjected to the resizing process is subsequently subjected to an image quality enhancement process, whereby a display image (a second image) is generated in the present embodiment. Furthermore, in the present embodiment, when the display image is specified as an object to be shared, the original image is subjected to the resizing process suitable for the sharing partner application or the sharing partner device, and the original image having been subjected to the resizing process is subsequently subjected to the image quality enhancement process, whereby a shared image is generated. The shared image thus generated is sent to the sharing partner application or sharing partner device. The resizing process suitable for the sharing partner application or sharing partner device is a process executed according to the resolution which the sharing partner application can handle or the display resolution of the sharing partner device. In this way, the present embodiment allows the sharing partner to use a high-definition image (to obtain a high-definition image).

In the present embodiment, any additional data that is added to a shared image (such as Exif data, for instance) will be automatically erased according to kinds of sharing partner applications. Therefore, when an image having Exif data is about to be posted to a social networking site, for instance, the Exif data will be automatically erased from the image and thus the leakage of personal data out of the Exif data will be surely prevented. Security therefore is firmly ensured in the present embodiment.

The present embodiment has been described such that any additional data having been added to an image should be automatically erased according to kinds of sharing partner applications. However, there is nothing wrong with subjecting the additional data to a process other than the erasing process. (It is possible to subject the additional data to an encryption process, for instance.)

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus, configured to execute a first application program for displaying an image, comprising:
    a storage configured to store sharing partner data indicative of an external device and/or a second application program, the second application program comprising a function of sharing images with the first application program; and
    a processor configured to:
    select a first image to be displayed by the first application program;
    resize the selected first image to a first resized image, the first resized image configured for display on the electronic apparatus;
    enhance the quality of the first resized image to generate a second image;
    display the second image;
    resize, when the displayed second image is designated as an object to be shared, the selected first image to a second resized image, the second resized image configured for the second application program and/or the display of the external device based on the sharing partner data stored in the storage; and
    enhance the quality of the second resized image to generate a third image, the third image sent to the second application program and/or the external device.

2. The electronic apparatus of claim 1, wherein
    the sharing partner data comprises resolution of an image allowed to be processed by the second application program and/or resolution of the external device, and
    the processor is further configured to resize the first image to the second resized image based on the resolution in the sharing partner data.

3. The electronic apparatus of claim 1, wherein the processor is further configured to erase data tagged with the third image, when the data is not preferable to be tagged with the third image in the second application program.

4. An image sharing method, executed by an electronic apparatus configured to execute a first application program for displaying an image, comprising:
    selecting a first image to be displayed by the first application program;
    resizing the selected first image to a first resized image, the first resized image configured for display on the electronic apparatus;
    enhancing the quality of the first resized image to generate a second image;
    displaying the second image;
    resizing, when the displayed second image is designated as an object to be shared, the selected first image to a second resized image, the second resized image configured for a second application program and/or the display of an external device based on the sharing partner data indicative of an external device or a second application program, the second application program comprising a function of sharing images with the first application program; and
    enhancing the quality of the second resized image to generate a third image, the third image sent to at the second application program and/or the external device.

5. A non-transitory computer-readable storage medium having stored thereon a computer program for displaying an image which is executable by a computer, the computer program comprising instructions capable of causing the computer to execute functions of:
    selecting a first image to be displayed by the program;
    resizing the selected first image to a first resized image, the first resized image configured for display on the electronic apparatus;
    enhancing the quality of the first resized image generate a second image;
    displaying the second image; and
    resizing, when the displayed second image is designated as an object to be shared, the selected first image to a second resized image, the second resized image configured for a second application program and/or the display of an external device based on the sharing partner data indicative of an external device and/or the second application program, the second application program comprising a function of sharing images with the first application program; and
    enhancing the quality of the second resized image to generate a third image, the third image sent to the second application program and/or the external device.

* * * * *